US006432523B1

(12) United States Patent
Ma et al.

(10) Patent No.: US 6,432,523 B1
(45) **Date of Patent: *Aug. 13, 2002**

(54) LIGHT FASTNESS OF INKJET IMAGES BY ADDING SALTS INTO INKJET INKS AND PRINT MEDIA

(75) Inventors: Zeying Ma; Yubai Bi; Bor-Jiunn Niu; Rodney D. Stramel, all of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/693,531

(22) Filed: Oct. 19, 2000

Related U.S. Application Data

(63) Continuation-in-part of application No. 09/491,642, filed on Jan. 27, 2000.

(51) Int. Cl.[7] .............................. B32B 3/26; B05D 1/36; B05D 3/10

(52) U.S. Cl. .................... 428/304.4; 427/322; 427/337; 427/340; 427/407.1; 427/411; 427/412.2

(58) Field of Search ................................ 427/322, 337, 427/340, 407.1, 411, 412.2; 428/304.4

(56) References Cited

U.S. PATENT DOCUMENTS

| | | | | | |
|---|---|---|---|---|---|
| 5,275,867 | A | | 1/1994 | Misuda et al. | 428/195 |
| 5,576,088 | A | | 11/1996 | Ogawa et al. | 428/327 |
| 5,605,750 | A | * | 2/1997 | Romano et al. | 428/304.4 |
| 5,670,249 | A | | 9/1997 | Tanuma | 428/304.4 |
| 5,700,850 | A | | 12/1997 | Nohr et al. | 522/34 |
| 5,773,182 | A | | 6/1998 | Nohr et al. | 430/106 |
| 5,851,273 | A | * | 12/1998 | Morris et al. | 106/31.27 |
| 5,855,655 | A | * | 1/1999 | Nohr et al. | 106/31.27 |
| 5,855,657 | A | * | 1/1999 | Bergthaller et al. | 106/31.57 |
| 5,919,291 | A | | 7/1999 | Hotomi et al. | 106/15.05 |
| 5,935,688 | A | * | 8/1999 | Bergthaller et al. | 428/195 |

FOREIGN PATENT DOCUMENTS

| | | | |
|---|---|---|---|
| EP | 0878322 | 11/1998 | B41M/5/00 |
| WO | WO84/03295 | 8/1984 | C09D/11/02 |

* cited by examiner

*Primary Examiner*—Michael Barr

(57) ABSTRACT

At least one of the following compounds is included on a surface layer of a print medium and in an inkjet ink formulation to be printed thereon: potassium iodide, sodium iodide, sodium thiosulfate, potassium thiosulfate, and sodium thiocyanate. The addition of at least one of these compounds to both the print medium and the inkjet ink can improve light fastness on the order of eight to thirteen times or more on porous glossy media. These additives are particularly effective with water-soluble dyes, including such dyes as Reactive Black 31 (Pacified) (RB31), Direct Blue 199 (DB199), Magenta 377 (M377), and Direct Yellow 132 (DY132).

20 Claims, 1 Drawing Sheet

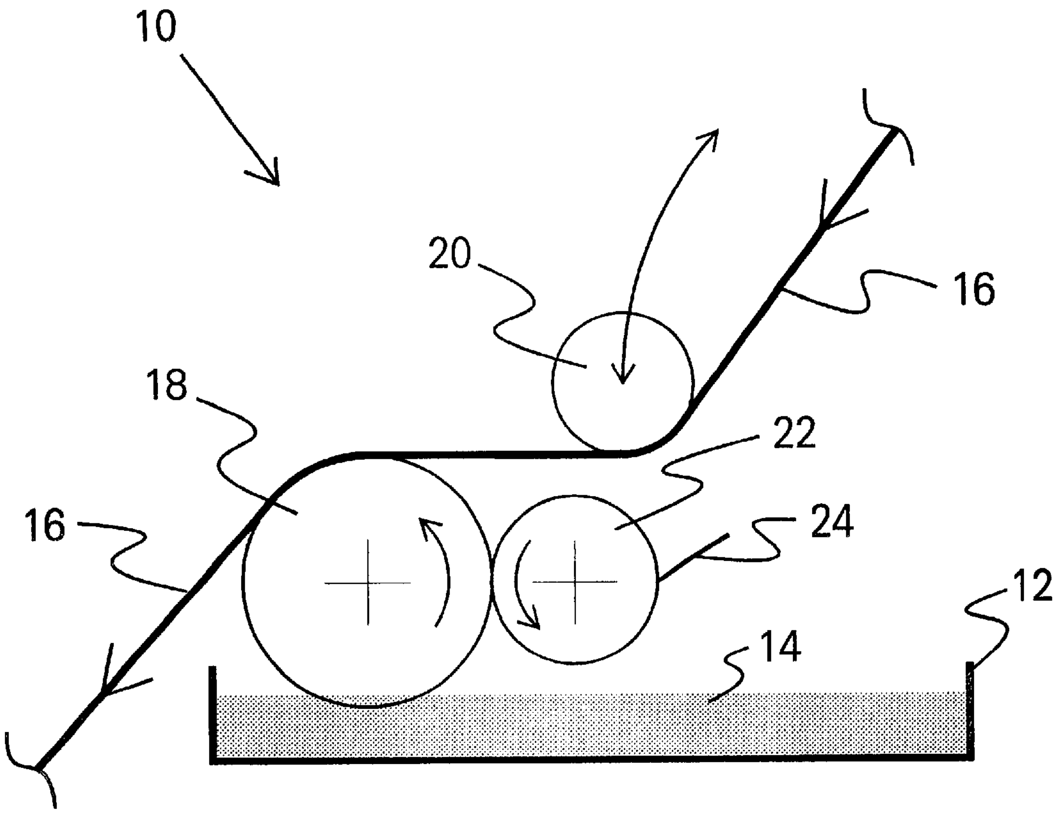
10
20
16
18
22
16
24
12
14

LIGHT FASTNESS OF INKJET IMAGES BY ADDING SALTS INTO INKJET INKS AND PRINT MEDIA

CROSS-REFERENCE TO RELATED APPLICATIONS

The present application is a continuation-in-part application of Ser. No. 09/491,642, filed Jan. 27, 2000. That application discloses and claims the formation of a porous basecoat on a non-permeable substrate, followed by the formation of a topcoat on the porous basecoat, with application of a re-wet liquid to the porous basecoat prior to applying the topcoat thereon. The present invention is directed to including a specified colorant stabilizer in the re-wet liquid to stabilize the colorant of ink printed on the ink-receiving layer.

The present application is related to application Ser. No. 09/693,676, filed on even date herewith. That invention is directed to including a specified colorant stabilizer in a re-wet liquid to stabilize the colorant of ink printed on an ink-receiving layer formed on a porous glossy print medium. The present invention is directed to printing an ink on the glossy print media, wherein the ink also includes one of the specified colorant stabilizers.

TECHNICAL FIELD

The present invention relates generally to inkjet printing, and, more particularly, to stabilizing colorants printed onto an ink-receiving layer applied to a non-absorbant substrate.

BACKGROUND ART

1. Inkjet Receiving Lavers

Inkjet receiving layers need to absorb the ink vehicle delivered during the printing process. When the ink-receiving layer is applied to non-absorbent substrate, the substrate provides no absorption capacity and as a result, the ink-receiving layer must be the sole absorbing material. To increase the absorbing capacity of the coating, an absorbent basecoat has been described in the prior art that serves to increase the capacity of the coating, much as a substrate functions in paper-based inkjet media. A topcoat is applied to control surface properties such as gloss, tackiness, surface energy, and durability, as well as to function in concert with the adsorbent basecoat. In addition, the topcoat must be free of defects that would contribute to perceived irregularities or non-uniformities in the coating.

U.S. Pat. No. 5,275,867 describes a two-layer coating and a coating process where a topcoat is laminated on the precoat. U.S. Pat. No. 5,605,750 describes a three-layer coating and a coating process where the topcoats are applied to the precoat by coating both fluids before drying in a multi-slot hopper or a slide hopper. U.S. Pat. No. 5,576,088 describes a two layer coating and a coating process where a topcoat is cast coated on a precoat. All these examples describe a process that involves specialized equipment and coatings engineered to be compatible with the processes. In addition, production efficiencies may be lower.

An on-going problem in the application of a topcoat with basic coating equipment such as mayer rod and slot die coaters is the formation of bubbles in the topcoat when it is coated on a porous basecoat that has been applied to a non-porous substrate. These bubbles are formed when the air voids in the pores of the basecoat are filled with fluid from the topcoat application process which results in the air being forced to surface of the basecoat where they coalesce into bubbles in a still fluid topcoat. These bubbles can then form defects in the topcoat as that coating is dried. Another challenge when developing coating fluids and chemistries is avoiding problems associated with incompatible chemistries that result in solution gelling or phase separation in the dried coatings.

Above-referenced application Ser. No. 09/491,642 provides a solution to the foregoing problems by adding a re-wet liquid coating subsequent to forming the basecoat and prior to forming the topcoat. The resulting process permits the topcoat to be applied to a porous basecoat that is coated on a non-porous, or non-permeable, substrate such that bubbles are not formed in the topcoat. This allows the production of defect-free coatings.

2. Stabilization of Colorant

Porous inkjet media provides superior image quality and essentially instant drying, which permits high throughput in inkjet printing. However, because of the porosity, dyes residing on the porous media can be easily accessed by oxygen and moisture. The dyes have very poor stability when exposed to light, especially ultraviolet (UV) light.

A light-fast dye printed on well-designed swellable media can have a lifetime of five or more years; however, such a dye may last only few weeks, or even only a few days, on porous media. It is important to improve the light-fastness of inkjet ink on porous media to obtain the many positive attributes of porous media.

To the best of the inventors' knowledge, there is no good solution yet existing in this field. Presently-available commercial porous media without lamination or post-printing treatment can only last three months in office lighting because of image fade.

The most common way to improve light-fastness is through the use of light-fast dyes or pigments (colorants). The majority of light-fast dyes are metal complex dyes. There are often toxicity concerns with such metal complex dyes. In addition, these metal complex dyes are dull in color. Good color reproduction and sharp tones are not achievable with those dyes.

Although pigmented inks provide good light/oxygen resistance, they do not render the high image quality of a dye-based ink.

Many light-fastness additives have been tested in both media formulations and ink formulations. Some of these additives are well-reported UV absorbers, radical scavenger, and antioxidants. These additives have been shown to be effective for non-porous media. However, many of these additives are not effective for porous glossy media. Some of these additives have shown a slight improvement in light-fastness, but caused gloss loss and media formulation instability (i.e., non-manufacturable).

An example of a reference disclosing light-fastness additives is U.S. Pat. No. 5,855,655, entitled "Colorant Stabilizers", issued to R. S. Nohr et al on Jan. 5, 1999, and assigned on its face to Kimberly-Clark Worldwide, Inc. This reference discloses a number of colorant stabilizers, including (1) certain aryliminealkenes, (2) heavy metal ions, such as iodide ions, (3) certain derivatives of phenols, (4) reducing agents, such as sodium thiosulfate, sodium sulfite, cysteine, sodium nitrite, sodium phosphite, and citric acid, (5) certain molecular includants, such as clathrates, zeolites, crown ethers, calix-arenes, valinomycin-type natural antibiotics, various polyether compounds, nigericin-type natural antibiotics, and cyclic compounds containing a plurality of pyranose rings such as cyclodextrins, (6) certain porphines, (7) metals or metal salts alone or in combination with at lest one other colorant stabilizer, wherein the metal or metal salt is a lanthanide element or salt, respectively, magnesium, iron, zinc, other transition metals, and heavy metals, (8) dimethyl amino benzoic acid quat, (9) a basic fuschin hydrazone, and (10) a benzophenone. The colorant stabilizer may be added to (1) solvent- or oil-based colorant compositions or (2) water-based colorant compositions or may be formed on the surface of a print medium, such as inkjet paper. Examples of print media listed include a wood product or composite, woven fabric, nonwoven fabric, textile, plastic, and glass. Examples of plastic substrates include plastic films, plastic nonwoven webs, and plastic woven webs. The preferred substrate is paper, including printing and writing papers, packaging and industrial papers, paperboard, and tissue papers.

While many specific examples of papers are listed, there is no specific mention of glossy paper, such as used in photographic-quality reproduction. Further, it turns out that glossy paper may not simply be coated with one of the above-listed colorant stabilizers, due to chemistry considerations, namely, the possible loss of gloss, the possible adverse impact on print quality, the possible drift in pH, and the possible agglomeration of pigment (colorant) and/or polymer.

Thus, there remains a need for a method that provides colorant stabilization for glossy print media.

DISCLOSURE OF INVENTION

In accordance with the present invention, at least one of the following compounds is applied as a re-wet solution to media: potassium iodide, sodium thiosulfate, and sodium thiocyanate. The addition of at least one of these three compounds to the re-wet solution can improve light fastness on the order of eight to thirteen times on porous glossy media. These additives are particularly effective with dyes such as Reactive Black 31 (Pacified) (RB31), Direct Blue 199 (DB199), Magenta 377 (M377), and Direct Yellow 132 (DY132).

In particular, an improved process is provided for applying at least one ink-receiving layer to a non-permeable substrate. The ink-receiving layer is used to stabilize at least one colorant in at least one ink printed thereon. The ink-receiving layer comprises a non-permeable substrate, a porous basecoat formed thereon and comprising a plurality of pores, and a topcoat formed on said porous base coat. The process comprises:

(a) applying the porous basecoat to a surface of the non-permeable substrate;

(b) applying a re-wet liquid to the porous basecoat; and (b) applying a topcoat on the re-wet liquid.

The improvement comprises formulating said re-wet liquid to contain at least one compound selected from the group consisting of potassium iodide, sodium thiosulfate, and sodium thiocyanate.

BRIEF DESCRIPTION OF THE DRAWINGS

The sole FIGURE illustrates apparatus useful in the practice of the present invention.

BEST MODES FOR CARRYING OUT THE INVENTION

Reference is made now in detail to a specific embodiment of the present invention, which illustrates the best mode presently contemplated by the inventors for practicing the invention. Alternative embodiments are also briefly described as applicable.

A. Print Media:

The basecoat and the topcoat each comprise one or more pigments and one or more binders, which are polymeric compounds soluble or dispersible in the solvent in which the basecoat and topcoat are applied to the substrate. The basecoat may employ opaque, colorless pigments, but the topcoat employs translucent colorless pigments. Examples of pigments include silica and alumina and its various hydrates, titania, carbonates (e.g., calcium carbonate, magnesium carbonate), glass beads, and organic pigments (e.g., plastic or polymer pigments such as cross-linked SBR latexes, micronized polyethylene or polypropylene wax, acrylic beads, and methacrylic beads). The pigment may be the same in both the basecoat and topcoat or different.

The binder is a polymeric matrix which serves, among other things, to hold the pigment(s) in place. The binder can be water-soluble or water-dispersible. Examples of water-soluble binders include polyvinyl alcohol and its derivatives, polyvinyl pyrrolidone/polyvinyl acetate copolymer, cellulose derivatives, polyamides, and polyethylene oxide. Examples of water-dispersed binders include styrene-butadiene latexes, polyacrylics, polyurethanes, and the like. The binder may be the same in both the basecoat and topcoat or different.

The basecoat and topcoat are separately applied in solution to the substrate and allowed to dry.

The substrate comprises non-permeable (non-air permeable) material, such as a film-based material, e.g., Mylar, or a resin-coated papers (e.g., photobase paper).

In accordance with the present invention, pores in the basecoat are saturated, or nearly saturated, with a liquid, also called a re-wetting solution herein, before the topcoat solution is applied. Preferably, the pores in the basecoat are saturated with liquid before the topcoat solution is applied. Also preferably, a solvent that is compatible with the solvent in the topcoating is believed to give the best adhesion between coating layers.

In addition to any of the components listed below, the re-wet liquid comprises at least one of the additive compounds of potassium or sodium iodide, sodium or potassium thiosulfate, and sodium thiocyanate. Preferably, a thiosulfate is employed, most preferably, sodium thiosulfate. The concentration of the additive compound in the re-wet liquid is in the range of about 1 to 10 wt %, preferably 4 wt %, based on the total re-wet composition. Each of these compounds, when included in the re-wet liquid, has been found to provide colorant stabilization against fading due to long term exposure to light. In particular, these compounds have been found to improve light-fastness by a factor of 8 to 13 times, for example, on porous glossy media. These additives are effective with water-based dyes such as Reactive Black 31, Direct Blue 199, Magenta 377, and Direct Yellow 132, as well as with other water-soluble dyes.

The re-wet liquid may comprise one or more solvents. The re-wet liquid may be heated or chemically modified to increase the penetration rate in the precoat.

If heated, the liquid is heated to any temperature below its boiling point (or the minimum boiling point if two or more solvents are used).

By "chemically modified" is meant the addition of one or more surfactants, adhesion promoters, pH modifiers, polymers, crosslinkers, pigments, and/or dye stabilizers to the liquid. The chemically modified re-wet solution thus serves to modify the properties of the basecoat, topcoat, the coating process, or the performance of the coatings as it relates to its use as a printing media. Any of the usual surfactants, pH modifiers, and/or crosslinkers may be used in the practice of the present invention. For example, where the binder in the basecoat is polyvinyl alcohol, a suitable crosslinker added to the liquid is a borate or glyoxyl. This process is especially useful for chemistries that are not compatible with the coating fluids or process.

It is also preferred that excess fluid on the surface of the basecoat be removed before topcoating. This can be accomplished by a nip, doctoring blade, or the like.

The sole FIGURE shows apparatus 10 useful in the process of the present invention. The apparatus 10, which is a conventional coater, comprises a container 12 for containing a re-wetting solution 14. A web 16 comprises the non-absorbent substrate and a porous basecoat thereon and the solution 14 is introduced onto the surface of the porous basecoat by means of an applicator roller 18. A hold-down roller 20 urges the 10 web 16 against the top of the applicator roller 18. The applicator roller 18 applies the liquid 14 to the web 16. The liquid 14 is metered onto the applicator roller 18 by a metering roller 22, provided with a doctor 24, or other suitable means.

In an alternate embodiment, the excess re-wet solution may be doctored off of the web.

In another alternative embodiment, the re-wet solution can be metered by a pump directly onto the moving web 16, thus eliminating the need for doctoring.

The uptake of the liquid 14 depends on the speed of the web 16. It is desired to move the web 16 as fast as possible to maximize the coating efficiency.

The dwell time of the re-wet fluid is defined as the time interval between application of the re-wet fluid and application of the coating. The dwell time thus determines the length of time available for the re-wet solution to penetrate into the base-coat. The dwell time can be modified by the web speed and web distance between the re-wet station and the coating station. The length of time required to obtain adequate saturation of the basecoat is determined by the design of the re-wet station, the base-coat properties, the topcoat properties, and the re-wet fluid properties. For this process to be effective, all of these parameters need to be accounted for when designing the coating process.

The inclusion of a re-wetting step provides a number of advantages. First, the re-wetting permits applying a topcoat solution on porous basecoats formed on non-porous substrates. Second, the invention permits incorporation of materials for either the basecoat or the topcoat that would otherwise be incompatible with each other. Third, the invention allows incompatible liquids to be coated in multilayer systems.

The use of the enumerated additives provides a number of additional advantages, including:

(1) improvement of light fastness of inkjet images on porous media (the porous media enables a fast dry solution for the printer);

(2) improvement of light fastness in humid conditions;

(3) providing flexibility in dye selection, which means better color quality of the image;

(4) enables acceptable pen reliability and jetability; and (5) permits manufacture of media with these additives.

B. Printing Inks:

Additional improved lightfastness is achieved by incorporating in the ink itself one or more of the above-listed additive compounds of potassium or sodium iodide, sodium or potassium thiosulfate, and sodium thiocyanate. Preferably, the same additive is used in both the print media and in the ink. The concentration of the additive ranges from about 1 to 8 wt %, preferably about 3 to 4 wt %, of the total ink composition.

EXAMPLES

Example 1

The salt solution was applied to the print media in the media coating process. In this instance, the current coating had two layers (basecoat and topcoat, as described above). The basecoat was coated on the medium and then dried; the topcoat was coated after rewetting the basecoat. The additive salt (potassium or sodium iodide, sodium or potassium thiosulfate, and/or sodium thiocyanate) was included in the re-wet solution, as described above.

The paper was printed with an ink-jet ink set having the formula given in Table I below, as modified with an additive, as explained below.

TABLE I

Ink Formulations.

| Component/ Color | Cyan (C), wt % | Magenta (M), wt % | Yellow (Y), wt % | Light C, wt % | Light M, wt % |
|---|---|---|---|---|---|
| EDTA, Na salt | 0.1 | 0.1 | 0.1 | 0.1 | 0.1 |
| Proxel GXL | 0.15 | 0.15 | 0.15 | 0.15 | 0.15 |
| MOPS | 0.05 | 0.05 | 0.05 | 0.05 | 0.05 |
| ZONYL FSA | 0.8 | 0.8 | 0.8 | 0.8 | 0.8 |
| DOWFAX 2A1 | 0.32 | 0.32 | 0.32 | 0.32 | 0.32 |
| SURFYNOL CT-111 | 0.16 | 0.16 | 0.16 | 0.16 | 0.16 |
| 1,6-hexanediol | 9 | 9 | 9 | 9 | 9 |
| 2-pyrrolidone | 4 | 4 | 4 | 4 | 4 |
| Na-DB199 @ 1/10 K | A = 0.10 | | | 30% of C A = 0.03 | |
| Na-M377 @ 1/10 K | | A = 0.079 | | | 30% of M A = 0.0237 |
| Na-AR52 @ 1/10 K | | A = 0.038 | | | 30% of M A = 0.0114 |
| Na-DY132 @ 1/10 K | | | A = 0.119 | | |
| DDI Water | Balance | Balance | Balance | Balance | Balance |
| Total | 100 wt % | 100 wt % | 100 wt % | 100 wt % | 100 wt % |

Notes:
EDTA is ethylene diamine tetraacetate.
MOPS is 4-morpholinepropanesulfonic acid.
DDI water is distilled deionized water.
pH adjusted with KOH for the vehicle to 7.1 to 7.2.
pH adjusted with KOH or $HNO_3$ for final ink to 7.5.
Proxel GXL is a biocide.

Absorbance (A) spectra were measured on a Hewlett-Packard 8453 spectrophotometer at 1:10,000 dilution ("1/10K").

The following Table II sets forth a comparison of the combination of (1) both ink and media containing the additive and (2) both the ink and media without the additive. In the first case, the ink included 0.5 wt % KI plus 4 wt % sodium thiosulfate and the media was treated with a re-wet solution containing 1.01 M sodium thiosulfate. The last two columns list the percent OD loss from the initial OD.

The ink set was the one listed in Table I, but with the addition of the additive, as noted above. The light fastness was measured on an H-P fadeometer, having an intensity of 58 to 70 Klux, for 72 hours. The OD was measured prior to and subsequent to the light exposure. The OD loss was determined by the ANSI standard IT 9.9 method (1996).

TABLE II

Comparison of Ink and Media with Additive to Ink and Media without Additive.

| Color | Initial OD | OD Loss: Ink with Additive Treated Media | OD Loss: Ink without Additive Untreated Media |
|---|---|---|---|
| Black | 0.5 | 14 | 24 |
| Black | 1.0 | 11 | 18 |
| Cyan | 0.5 | 1 | 11 |
| Cyan | 1.0 | 2 | 10 |
| Magenta | 0.5 | 10 | 37 |
| Magenta | 1.0 | 9 | 32 |
| Yellow | 0.5 | 26 | 45 |
| Yellow | 1.0 | 21 | 41 |
| Blue (cyan-magenta) | 0.5 | −8 | −21 |
| Blue (cyan-magenta) | 1.0 | −9 | −19 |
| Green (cyan-yellow) | 0.5 | −7 | −14 |
| Green (cyan-yellow) | 1.0 | −2 | −7 |
| Red (magenta-yellow) | 0.5 | −2 | 13 |
| Red (magenta-yellow) | 1.0 | 1 | 14 |

For black, cyan, magenta, and yellow, the lower the value of OD loss, the better the light fastness. For blue, green, and red, it is important to have uniform color as the sample fades. For these colors, the difference between the two primary colors is measured. Values near zero indicate uniform color, while values greater than or less than zero indicate color imbalance, resulting in non-uniform image quality.

Based on the foregoing, it is evident that the combination of treated ink and treated media is seen to be superior to the combination of untreated ink and untreated media.

Example 2

A series of tests were performed in which (1) the ink was devoid of the additive and the media was untreated; (2) the ink was devoid of the additive and the media was treated with (a) potassium thiosulfate, (b) potassium iodide, (c) sodium thiosulfate, and (d) sodium iodide; and (3) the ink contained sodium thiosulfate and the media was treated with one of the four additives (a)–(d).

The ink contained 4 wt % sodium thiosulfate. The paper was treated with a pre-wet solution containing 4 wt % of one of the additives (a)–(d).

The ink was the same base composition as in Example 1, and the print medium was the same as in Example 1. The measurement of light fastness was the same as in Example 1.

The results are shown in Table III below. In Table III, a color followed by a letter (e.g., "Red M") indicates the component for that color, where M is magenta, Y is yellow, and C is cyan. (Red comprises magenta and yellow; green comprises cyan and yellow; and blue comprises cyan and magenta.) Thus, the values for OD loss refer to the measured loss of that component (e.g., "Red M" signifies the OD loss of magenta from red, while "Green Y" signifies the OD loss of yellow from green, and so forth).

TABLE III

Comparison of (a) Ink and Media without Additive, (b) Ink without Additive and Media with Additive, and (c) Ink and Media with Additive.

| color | Ink media Starting OD | no additive no treatment | no additive $K_2S_2O_3$ | $Na_2S_2O_3$ $K_2S_2O_3$ | no additive KI | $Na_2S_2O_3$ KI | no additive $Na_2S_2O_3$ | $Na_2S_2O_3$ $Na_2S_2O_3$ | no additive NaI | $Na_2S_2O_3$ NaI |
|---|---|---|---|---|---|---|---|---|---|---|
| | | Percent OD Loss after 72 hours at 65 Klux | | | | | | | | |
| Black | 0.5 | 44 | 27 | 25 | 35 | 32 | 33 | 33 | 32 | 26 |
| Black | 1.0 | 41 | 27 | 24 | 30 | 22 | 26 | 24 | 26 | 21 |
| Cyan | 0.3 | 28 | 17 | 16 | 18 | 22 | 20 | 21 | 20 | 16 |
| Cyan | 0.5 | 27 | 20 | 19 | 16 | 17 | 17 | 17 | 18 | 13 |
| Cyan | 1.0 | 28 | 24 | 23 | 16 | 12 | 14 | 13 | 17 | 10 |
| Magenta | 0.3 | 73 | 48 | 50 | 81 | 84 | 82 | 83 | 83 | 76 |
| Magenta | 0.5 | 69 | 47 | 44 | 76 | 79 | 77 | 78 | 79 | 72 |
| Magenta | 1.0 | 63 | 46 | 43 | 65 | 68 | 66 | 67 | 66 | 64 |
| Yellow | 0.5 | 68 | 44 | 36 | 60 | 41 | 51 | 46 | 53 | 26 |
| Yellow | 1.0 | 54 | 32 | 26 | 54 | 37 | 45 | 41 | 43 | 30 |
| Red M | 0.5 | 69 | 51 | 49 | 64 | 61 | 62 | 61 | 63 | 56 |
| Red Y | 0.5 | 58 | 30 | 30 | 53 | 41 | 47 | 44 | 47 | 27 |
| Green C | 0.5 | 28 | 25 | 23 | 20 | 14 | 17 | 16 | 21 | 10 |
| Green Y | 0.5 | 40 | 24 | 24 | 30 | 6 | 18 | 12 | 23 | 11 |
| Blue C | 0.5 | 26 | 22 | 21 | 22 | 14 | 18 | 16 | 25 | 10 |
| Blue M | 0.5 | 56 | 43 | 36 | 57 | 54 | 55 | 55 | 60 | 47 |
| CMY Y | 0.5 | 39 | 20 | 20 | 39 | 7 | 23 | 15 | 30 | 10 |
| CMY C | 0.5 | 28 | 25 | 20 | 21 | 10 | 16 | 13 | 23 | 8 |
| CMY M | 0.5 | 55 | 46 | 38 | 52 | 45 | 49 | 47 | 55 | 39 |

It can be seen in Table III that the case of untreated ink and untreated media provides the worst light fastness. Light fastness improves with a combination of treated media and treated ink.

INDUSTRIAL APPLICABILITY

The use of the three additives, alone or in combination both in the ink and on the print medium, is expected to find use in increasing the light fastness of inks on porous glossy media.

What is claimed is:

1. In combination, (1) a print medium comprising an ink-receiving layer formed on a non-permeable substrate, said ink-receiving layer for stabilizing at least one colorant in at least one ink printed thereon, said ink-receiving layer comprising a porous basecoat formed thereon and comprising a plurality of pores, said ink-receiving layer further comprising at least one first pigment and at least one first binder, a topcoat formed on said porous base coat, said topcoat comprising at least one colorless second pigment and at least one second binder, wherein said at least one first pigment may be the same or different as said at least one colorless second pigment and wherein said at least one first binder may be the same or different as said at least one second binder, and a re-wet layer between said basecoat and said topcoat that includes at least one first light fastness additive, and (2) an inkjet ink comprising a vehicle and at least one colorant, said ink further comprising at least one second light fastness additive, said combination resulting in a light fast image upon printing said inkjet ink on said print medium that has a greater degree of light fastness than print media and inkjet inks not containing said additives.

2. The combination of claim 1 wherein said at least one first light fastness additive and said at least one second light fastness additive are the same.

3. The combination of claim 1 wherein said at least one first light fastness additive and said at least one second light fastness additive are different.

4. The combination of claim 1 wherein said at least one first light fastness additive is selected from the group consisting of potassium iodide, sodium iodide, sodium thiosulfate, potassium thiosulfate, and sodium thiocyanate.

5. The combination of claim 1 wherein said at least one second light fastness additive is selected from the group consisting of potassium iodide, sodium iodide, sodium thiosulfate, potassium thiosulfate, and sodium thiocyanate.

6. The combination of claim 1 wherein said at least one first light fastness additive in said re-wet layer has a concentration of about 1 to 10 wt %.

7. The combination of claim 6 wherein said at least one first additive in said re-wet layer has a concentration of about 4 wt %.

8. The combination of claim 1 wherein said at least one second light fastness additive in said inkjet ink has a concentration of about 1 to 8 wt %.

9. The combination of claim 8 wherein said at least one second light fastness additive in said inkjet ink has a concentration of about 3 to 4 wt %.

10. The combination of claim 1 wherein said colorant is a water-soluble dye.

11. The combination of claim 10 wherein said colorant is selected from the group consisting of Reactive Black 31, Direct Blue 199, Magenta 377, and Direct Yellow 132.

12. A method for forming a light fast image on a print medium from an inkjet ink printed thereon, said process comprising (a) providing said print medium with a re-wet layer comprising at least one first light fastness additive, wherein said re-wet layer is formed on an ink-receiving layer and a topcoat is formed on said re-wet layer, said ink-receiving layer comprising a porous basecoat formed thereon and comprising a plurality of pores, said ink-receiving layer further comprising at least one first pigment and at least one first binder and said topcoat comprising at least one colorless second pigment and at least one second binder, wherein said at least one first pigment may be the same or different as said at least one colorless second pigment and wherein said at least one first binder may be the same or different as said at least one second binder; and (b) providing said inkjet ink with at least one second light fastness additive, which may be the same or different as said first light fastness additive.

13. The method of claim 12 wherein said print medium comprises an ink-receiving layer formed on a non-permeable substrate, said ink-receiving layer for stabilizing at least one colorant in at least one ink printed thereon, said ink-receiving layer comprising a porous basecoat formed thereon and comprising a plurality of pores, a topcoat formed on said porous base coat, and a layer between said basecoat and said topcoat that includes said at least one first light fastness additive.

14. The method of claim 13 wherein said ink-receiving layer is formed by:

(a) applying said porous basecoat to a surface of said non-permeable substrate;

(b) applying a re-wet liquid to said porous basecoat to form said re-wet layer, said re-wet liquid containing said at least one first light fastness additive; and (c) applying a topcoat on said re-wet liquid.

15. The method of claim 14 wherein said re-wet liquid contains about 1 to 10 wt % of said at least one first light fastness additive.

16. The method of claim 15 wherein said re-wet liquid contains about 4 wt % of said at least one first light fastness additive.

17. The method of claim 12 wherein said at least one second light fastness additive in said inkjet ink is present in a concentration within a range of about 1 to 8 wt %.

18. The method of claim 17 wherein said at least one second light fastness additive in said inkjet ink is present in a concentration within a range of about 3 to 4 wt %.

19. The method of claim 12 wherein said at least one first light fastness additive is selected from the group consisting of potassium iodide, sodium iodide, sodium thiosulfate, potassium thiosulfate, and sodium thiocyanate.

20. The method of claim 12 wherein said at least one second light fastness additive is selected from the group consisting of potassium iodide, sodium iodide, sodium thiosulfate, potassium thiosulfate, and sodium thiocyanate.

* * * * *